(No Model.) 2 Sheets—Sheet 1.

L. G. BOWMAN.
AUTOMATIC TELEPHONE EXCHANGE SYSTEM.

No. 574,707. Patented Jan. 5, 1897.

Witnesses
Inventor
Lawrence G. Bowman,
By Edward S. Duvall Jr.
his Attorney (No Model.) 2 Sheets—Sheet 2.
L. G. BOWMAN.
AUTOMATIC TELEPHONE EXCHANGE SYSTEM.
No. 574,707. Patented Jan. 5, 1897.

Witnesses.

Inventor.
Lawrence G. Bowman,
By Edward S. Duvall Jr.
Atty.

UNITED STATES PATENT OFFICE.

LAWRENCE G. BOWMAN, OF NEW YORK, N. Y.

AUTOMATIC TELEPHONE-EXCHANGE SYSTEM.

SPECIFICATION forming part of Letters Patent No. 574,707, dated January 5, 1897.

Application filed July 18, 1896. Serial No. 599,721. (No model.)

*To all whom it may concern:*

Be it known that I, LAWRENCE G. BOWMAN, a citizen of the United States, residing at New York, in the county of New York and State of New York, have invented certain new and useful Improvements in Automatic Telephone-Exchange Systems; and I do hereby declare the following to be a full, clear, and exact description of the invention, such as will enable others skilled in the art to which it appertains to make and use the same.

My invention relates to improvements in automatic telephone-exchange systems; and the object is to provide a system of circuits and apparatus in a system of individual telephone-lines whereby the several subscribers themselves may, through the medium of a central office, at will connect their respective lines with the lines of others and communicate with such other subscribers without the employment of operators at the central office, and so that such communicating lines may be private and confined to two subscribers or subject to connection by others, as desired at the time.

The essential features of the invention are a line from each individual subscriber to the exchange, a metallic, earth, or common return, mechanism at said exchange for effecting connections between one subscriber and any other desired, and means under the control of the individual subscriber at his station for governing the operation of said mechanism at said exchange.

With these and other objects and advantages in view the invention consists in certain new and novel features of construction and combination of parts hereinafter fully described and claimed.

Figure 1:
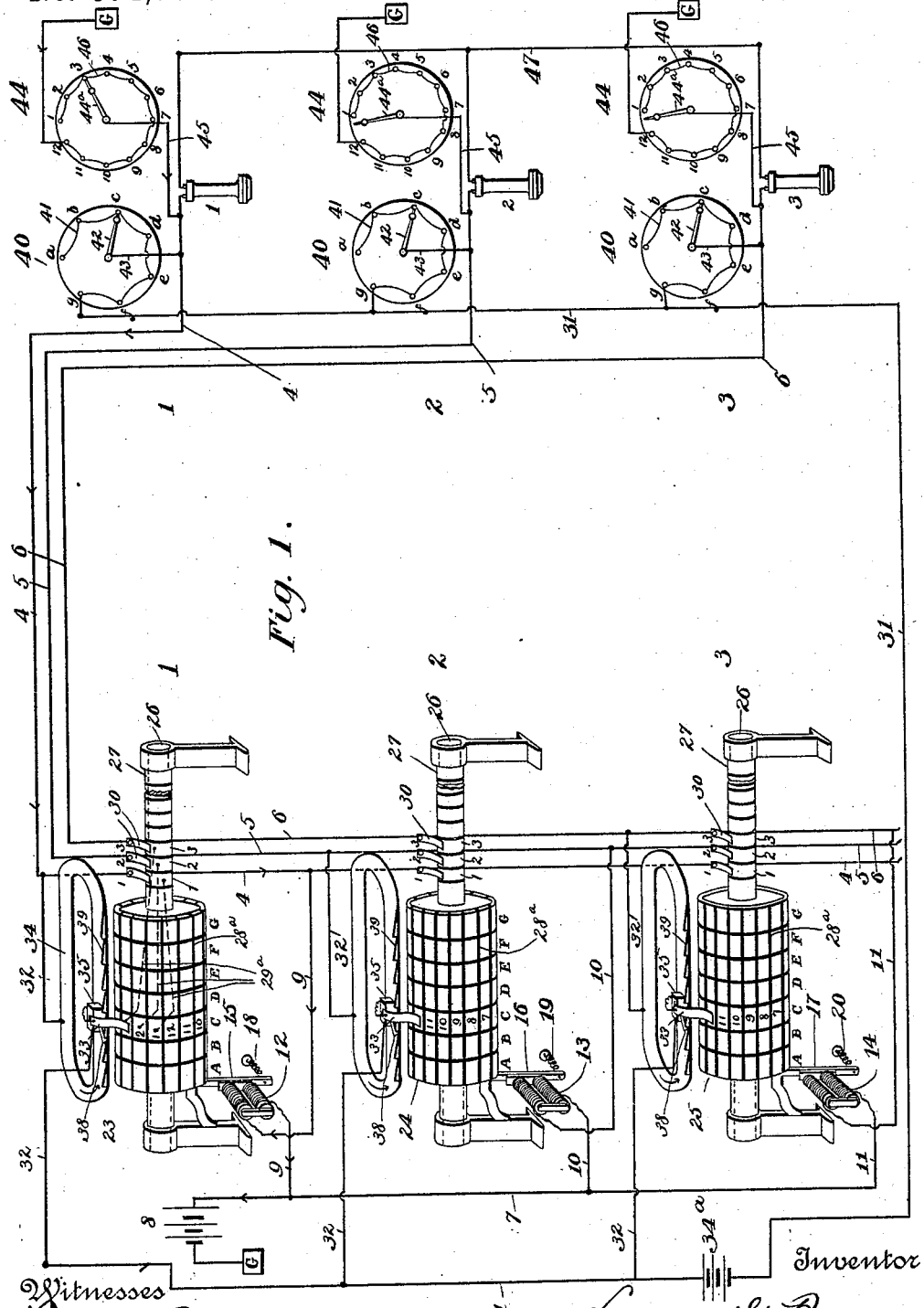
Figure 2:
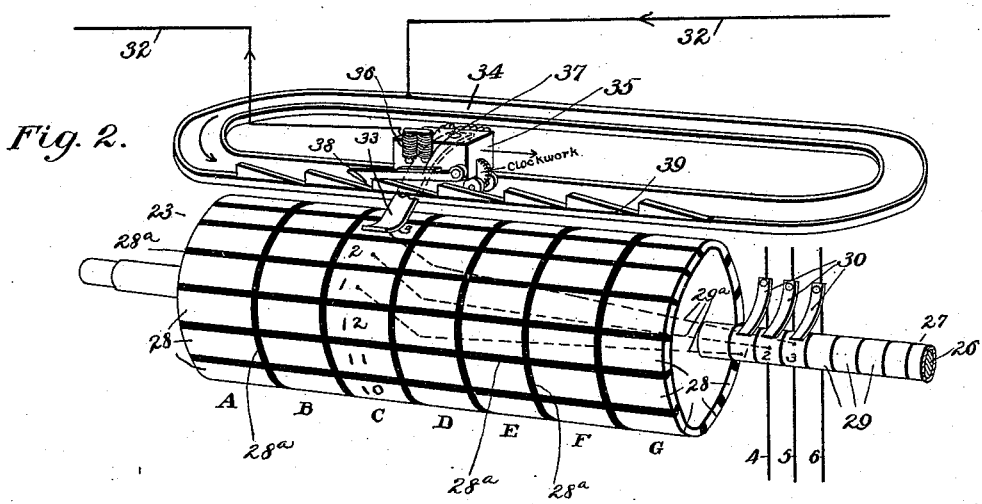
Figure 3:
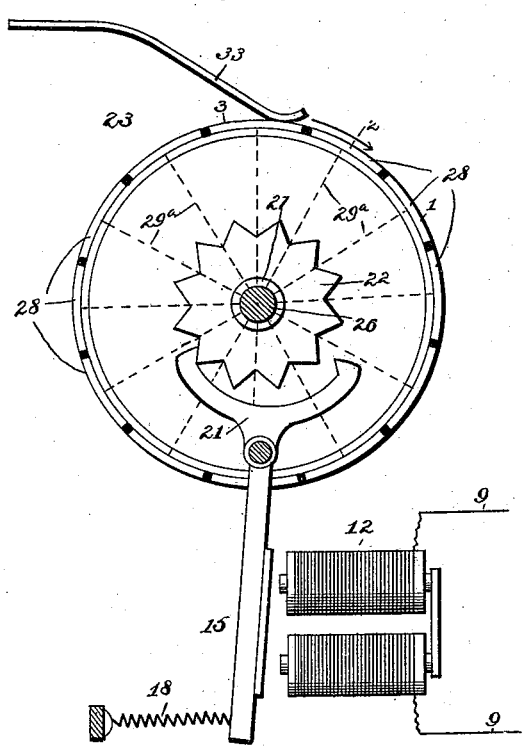
Figure 4:
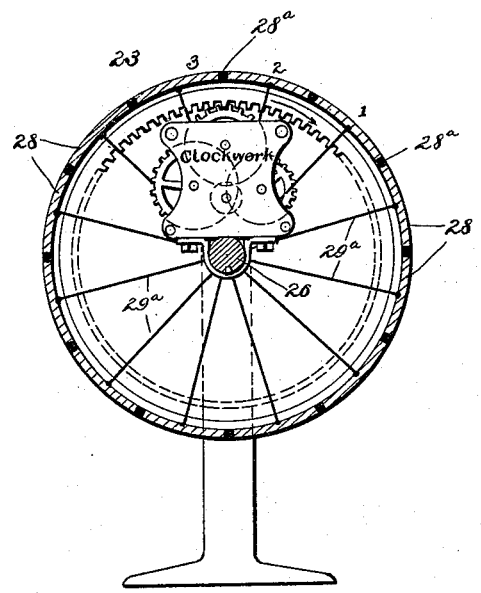

In the accompanying drawings, clearly illustrating my invention, Figure 1 is a view of my system arranged to include three subscribers with the necessary mechanism at the central office or exchange and at the subscriber's. Fig. 2 is a perspective view of one of the contact-drums and brush-carrying mechanism, and Fig. 3 is an end elevation of one of the drums. Fig. 4 is a transverse sectional view of the contact-drum.

Like numerals of reference designate like parts throughout the several figures of the drawings.

For the purposes of rendering the operation of the system easy of understanding and simplifying the explanation I have illustrated it as embracing only three subscribers, whereas it is designed and the exchange apparatus made suitable for the accommodation of a much larger number.

Each subscriber is provided with the usual transmitter and receiver 1, 2, and 3, and leading from these and centering at the exchange are the line conductors 4, 5, and 6. At the said exchange the line conductors above mentioned are connected to a common ground wire or conductor 7, provided with a common battery 8, and between the conductors 4, 5, and 6 and the common ground conductor 7 within the circuit of these connecting conductors, which I will designate as 9, 10, and 11, are the magnets 12, 13, and 14, wound to high resistance and considerable retardation. The object of so winding the magnets is to prevent the crossing of subscribers' lines.

Each of the electromagnets is provided with an armature 15, 16, and 17, normally held out of contact with the said magnet by the tension of the coil-springs 18, 19, and 20.

The armatures are somewhat elongated at the end opposite the point of connection with the spring, and at such end they have formed integrally therewith a double pawl 21. By pivoting the armatures at the point where the double pawl is united to it the jaws of said double pawl are allowed to alternately enter the interstices between the teeth of the pinions 22. This mechanism is designed to control the movement of a contact-drum revolved by clockworks or any other suitable motive power. These contact-drums are installed at the central station or exchange, and there is one for each subscriber and under the direct control of same. I will designate these drums 23, 24, and 25, and the shafts upon which they revolve 26. Surrounding said shafts and attached to the contact-drums are the shaft-inclosing sleeves 27, the utility of which will be more fully explained hereinafter.

The contact-drums 23, 24, and 25 are constructed with peripheral contact-plates properly insulated from each other. There are as many of such contact-plates 28 about the periphery of the drum as there are subscribers in the system, and as the plates are coincident with the arcs of the circumference of the drum, with the intervals of insulating material $28^a$, the number of such plates may be easily made to correspond with the number of subscribers, although it is not necessary to wire all the plates, as a few may be used and the remainder left unwired.

When a great number of subscribers are to be accommodated, the drums will be constructed as illustrated in Fig. 1 of the drawings. In this case a series of these peripheral contact-plates is augmented by a second, third, fourth, fifth, sixth, and seventh similar series, each of which I will designate with a letter of reference, as A, B, C, D, E, F, and G, said series being each properly insulated from the other by an intervening annular band of some suitable insulating material $28^a$. By following such construction it will be readily discerned that a great number of subscriber-contacts can be provided. All that is necessary is to find a suitable factor of the number of subscribers to be provided for and to divide the circumference of the drum correspondingly, making the number of series of such peripheral contacts as great as the multiple of the factor.

On the sleeve of each drum, and one for each subscriber, is provided an annular contact-band 29, such band being electrically wired by the conductor $29^a$ with its respective peripheral contact-plate 28 and being placed in electrical connection with the line conductor from its respective station by means of a brush 30. Now to provide for connecting each subscriber's line with the drum in such manner that he may at will, and by means of devices under his control and operated by him at his station, form a combination of his line with any other line desired. This is made possible by providing a common return 31, including a battery $34^a$, which return forms a portion of the circuit employed by the several subscribers, and connect their operating mechanisms with their respective carriage-shifting apparatus. To this return 31 each subscriber's line is electrically connected by the wires 32, and within the circuit of such battery and connecting-lines 32 is provided a brush 33, contacting with the drum and one for each subscriber's drum.

To allow the brush to contact with any series of peripheral contact-plates upon the drum, it is provided with shifting mechanism, the construction of which is as follows: A track or runway 34 is situated adjacent to a contact-drum, the form of such track in plan being that of a rectangle with rounded ends, the straight sides of the said rectangle being about the length of the drum and designed to parallel the same. This runway I construct of metal or other conductor of electricity, and the same is placed in the circuit on the line 32. On this runway is a shifting carriage 35, designed to carry the line-brush 33, and in order to properly shift this brush from one series of contacts to the next succeeding I employ means to propel the carriage and means for controlling the movement of the same. The means for propelling the carriage may be clockwork or other suitable motive power, and to control the forward movement I provide the carriage with an electromagnet 36, the polarization of which is opposite to that of the electromagnets 12, deriving current from the tracks of the runway 34. The armature 37 is pivotally attached to the carriage and provided with a depending jaw 38, adapted to take into the rack-bar 39, secured to the track of the runway parallel and adjacent to the contact-drum. The length of this rack-bar is coequal only with that of the contact-drum. Consequently when the carriage 35 has been shifted to the last notch of the rack-bar a further pulsation sent through the electromagnet will raise the jaw of the armature, and the shifting carriage being released will run the circumference of the track until it reaches the first notch, where it will be retained by the engagement of the jaw 38 in the teeth of the rack-bar 39. The object of oppositely polarizing the electromagnet on the shifting carriage and that used to control the revolution of the contact-drum is that the device at the subscriber's used to control the movement of the contact-drum might otherwise shift the carriage simultaneously; or, vice versa, the contact-drum might be revolved at the moment the device at the subscriber's was actuated to shift the carriage. It is essential and important that these be actuated independently, for the operation requires that the line-brush shall first be shifted to a position directly over the desired series of contacts in which is located the contact of the subscriber to be communicated with, and then and not till then the drum is to be revolved until the desired contact is directly in contact with the line-brush, and in order to accomplish these results independently of each other I employ certain features of construction located at the subscriber's and directly manipulated by him.

First, I install a disk 40, provided near its periphery with contact-points, one for each series of peripheral contact-plates on the contact-drum, and these I letter to correspond, as $a$, $b$, $c$, $d$, $e$, $f$, and $g$. From $a$ to $g$ I connect the contact-points by the wire 41 and then connect the said wires 41 to the common return 31, which is in electrical connection with each of the runways 34 and includes in its circuit the battery $34^a$. A centrally-pivoted hand 42, connected by the wire 43 with the line conductor of the respective subscriber, serves to make contact with any desired contact-point on the disk and by such movement over the points successively to shift the carriage on the runway from series A to B to C or wherever desired on his contact-drum at the exchange.

Secondly, there is provided another disk similar in construction to disk 40, which disk I will designate 44. This disk is provided with a centrally-pivoted contact-hand 44$^a$, connected by conductor 45 with the same line conductor as is disk 40, and also contact-points near the periphery of the disk, one for each contact-plate in a series. If there were ten series and fifty contact-plates in each series on the drum, there would be ten points on disk 40 and fifty on disk 44, and this would represent a total of five hundred subscribers. There is a common connection 46 from the first point to the last one, and the entire number are grounded.

This completes the construction and arrangement of parts with the exception of the common return-wire 47, joining all the transmitting and receiving instruments of the subscribers.

As a means of best illustrating the operation of my improved automatic telephone-exchange system let us assume that subscriber numbered 1 desires to communicate with subscriber numbered 3. First he moves the hand on the contact dial or disk 44 over the face of the same, passing and contacting successively with the points 1 and 2 until the hand reaches the point numbered 3, where it remains. The effect of this moving of the dial-hand is to cause a pulsation of current to pass through the line-wire 4 to the electromagnet 12 each time the said hand contacts with the several points. The course of the current is through line-wire 4 to the magnet, through the winding on said magnet-spools to line connection 9, to common ground-wire 7, and thence to ground, the energy being furnished by the battery 8. As the line connections on the dial and the line-wire 7 are both grounded, the circuit is completed the instant the dial-pointer touches a contact-point on said dial or disk. The closing of the circuit sends a pulsation through the electromagnet and attracting the armature actuates the double pawl 21 and allows the clock mechanism in the drum 23 to revolve the same one tooth of the pinion 22. As soon as the hand leaves the contact-point for the next the circuit is broken and further revolution of the drum is restrained by the separation of the armature from the magnet. Now that the dial-hand is in contact with the number 3 contact it indicates that the like number of contact-plate on the drum 23 is directly under the subscriber's line-brush 33. The subscriber now operates his transmitter and the circuit is through line-wire 4, through conductor 32, to the tracks of the runway 34, to the shifting carriage 35, whose electromagnet, being of opposite polarity to that of magnet 12, is not affected, to the line-brush numbered 33, from which, by reason of the contact with the contact-plate of the drum, it is transferred, or, better, translated, to the connecting-wire leading to the annular contact-band on the sleeve numbered 3, from thence to the brush contacting therewith, to the line-wire 6, and from thence to the transmitting and receiving apparatus at station 3, where it is completed by returning over the common return 47. This places the two subscribers in communication and a combination with any other two subscribers or this subscriber and any other can be effected by following the above operation.

Should subscriber No. 1 desire to communicate with No. (say) 190, the disk 40 would then be used in conjunction with disk 44, as follows: Move the hand on disk 40 around to $d$. This will shift the carriage 35 over to contact series D on the drum 23. In doing this the line-brush is brought over contacts running from 150 to 200, there being fifty contact-plates in each series, we will suppose. Now the disk or dial 44 is used, as above described, to revolve the said contact-drum 23 to the desired number in the series, which is 40, and the subscriber at 1 has opened a communication with subscriber 190. It is true that the same line-wire 4 is used for transmitting the pulsations from both dials to effect two different magnets, but as they are of different polarity they are not simultaneously affected.

I do not desire to limit myself to the precise details of construction or arrangement of parts, but reserve to myself the right and privilege to alter the same within the bounds of mechanical ingenuity without departing from the spirit of the invention.

Having thus described my invention, what I claim as new, and desire to secure by Letters Patent, is—

1. An automatic telephone system comprising a plurality of subscribers' lines and a central office, having a revoluble drum for each of said lines, said drums being provided each with peripheral contact-plates corresponding in number to the subscribers' lines, connections between the subscribers' lines and their respective contact-plates on the drum and a second connection from each subscriber's line to its respective drum and means for moving said connection relative to the drum to engage the contact-plates thereof successively and cut its line into circuit with a second line, substantially as described.

2. In an automatic telephone system the combination of a plurality of subscribers' lines and a central office provided with a revoluble drum for each line, peripheral series of contact-plates on each of said drums corresponding in number to and having connections with their respective subscribers' lines, a contact for each drum in electrical connection with its respective subscriber's line, means for shifting said contact with respect to the drum and means for revolving each drum to cause the plates of a series to engage successively with said contact and cut the line of the latter into circuit with a second subscriber's line, substantially as described.

3. An automatic telephone-exchange system comprising a plurality of subscribers' lines and a central office provided with a series of revoluble drums, one for each subscriber's line, a plurality of peripheral series of contact-plates on each drum, each plate being in electrical connection with a corresponding subscriber's line, a contact-point in electrical connection with each subscriber's line, means for moving the drum relative to said contact-point to cause engagement of the latter with the contact-plates of a series successively and means for shifting said contact-point to engage a different series of plates, substantially as described.

4. In an automatic telephone-exchange system, the combination with a plurality of subscribers' lines, of a central station provided with a revoluble drum for each subscriber's line, a plurality of peripheral series of contact-plates on each drum in connection with their respective subscribers' lines, a contact-point in electrical connection with each subscriber's line and adapted to successively engage the contact-plates on its respective drum, means operated from each subscriber's station for moving the drum relative to said contact-point and means operated from each subscriber's line for shifting its respective contact-point relative to the drum and cut its respective line into circuit with a second line, substantially as specified.

5. A system of the class described, comprising a plurality of subscribers' lines and a central station, the latter containing a revoluble drum for each subscriber's line, a plurality of peripheral series of contact-plates on each of said drums, in electrical connection with their respective subscriber's line, a contact-point for each drum in electrical connection with its respective subscriber's line, electromechanical means, operating from each subscriber's station, for moving each drum relative to its contact-point, a source of electricity of given potential, adapted to energize said means, and electromechanical means also operated from each subscriber's station for moving said respective contact-point relative to its drum, said means being energized from a source of electricity having a different potential from the aforesaid source, substantially as described.

6. A system of the class described, comprising a plurality of subscribers' lines and a central station, the latter containing a revoluble drum for each subscriber's line, a plurality of peripheral series of contact-plates on each of said drums, in electrical connection with their respective subscriber's line, a contact-point for each drum in electrical connection with its respective subscriber's line, electromechanical means for moving each drum relative to its contact-point, a source of electricity of given potential adapted to energize said means, and electromechanical means for moving its respective contact-point relative to its drum, said means being energized from a source of electricity having a different potential from the aforesaid source, substantially as described.

7. An automatic telephone system comprising a plurality of subscribers' lines and a central office, having a revoluble drum for each of said lines, said drums being provided each with peripheral contact-plates corresponding in number to the subscribers' lines, connections between the subscribers' lines and their respective contact-plates on the drum and a second connection from each subscriber's line to its respective drum, electromechanical means for moving said connection relative to the drum to engage the contact-plates thereof successively and cut its line into circuit with a second line, and means located at each subscriber's station in electrical connection with its respective electromechanical means for operating the latter, substantially as described.

8. In an automatic telephone system the combination of a plurality of subscribers' lines and a central office provided with a revoluble drum for each line, peripheral series of contact-plates on each of said drums corresponding in number to and having connections with their respective subscribers' lines, a contact for each drum in electrical connection with its respective subscriber's line, means for shifting said contact with respect to the drum, electromechanical means for revolving each drum to cause the plates of a series to engage successively with said contact and cut the line of the latter into circuit with a second subscriber's line, and means located at each subscriber's station for electrical connection with its respective electromechanical means for operating the latter, substantially as described.

9. An automatic telephone-exchange system comprising a plurality of subscribers' lines and a central office provided with a series of revoluble drums, one for each subscriber's line, a plurality of peripheral series of contact-plates on each drum, each plate being in electrical connection with a corresponding subscriber's line, a contact-point in electrical connection with each subscriber's line, means for moving the drum relative to said contact-point to cause engagement of the latter with the contact-plates of a series successively, electromechanical means for shifting said contact-point to engage a different series of plates, and means located at each subscriber's station for electrical connection with its respective electromechanical means for operating the latter, substantially as described.

10. An automatic telephone-exchange system comprising a plurality of subscribers' lines and a central office provided with a series of revoluble drums, one for each subscriber's line, a plurality of peripheral series of contact-plates on each drum, each plate being in electrical connection with the corresponding subscriber's line, a contact-point in electrical connection with each subscriber's line, electromechanical means for moving the drum relative to said contact-point to cause the plates of the series to successively engage said point, means located at each subscriber's substation for operating its respective electromechanical means, and in electrical connection therewith, electromechanical means for shifting said contact-points to engage a different series of plates and means located at each subscriber's station for operating its respective shifting means, substantially as described.

In testimony whereof I affix my signature in presence of two witnesses.

LAWRENCE G. BOWMAN.

Witnesses:
JOHN MORRIS,
F. W. WAKEFIELD.